(12) United States Patent
Teather

(10) Patent No.: US 8,517,570 B2
(45) Date of Patent: Aug. 27, 2013

(54) DIFFUSIVE LIGHT REFLECTORS WITH POLYMERIC COATING AND OPAQUE BLACKOUT LAYER

(75) Inventor: Eric William Hearn Teather, Elkton, MD (US)

(73) Assignee: WhiteOptics LLC, New Castle, DE (US)

( * ) Notice: Subject to any disclaimer, the term of this patent is extended or adjusted under 35 U.S.C. 154(b) by 0 days.

(21) Appl. No.: 12/959,733

(22) Filed: Dec. 3, 2010

(65) Prior Publication Data
US 2011/0103066 A1    May 5, 2011

Related U.S. Application Data

(63) Continuation of application No. 12/728,164, filed on Mar. 19, 2010, now abandoned.

(60) Provisional application No. 61/210,674, filed on Mar. 20, 2009.

(51) Int. Cl.
*F21V 7/00* (2006.01)
*F21V 7/22* (2006.01)
*F21V 3/04* (2006.01)
*B32B 27/12* (2006.01)
*B32B 27/02* (2006.01)
*B32B 27/32* (2006.01)

(52) U.S. Cl.
USPC .............. 362/296.01; 362/341; 362/311.01; 442/132; 442/164; 442/394; 442/398

(58) Field of Classification Search
USPC .............. 442/59–180, 394–398; 362/296.01, 362/311.01, 341
See application file for complete search history.

(56) References Cited

U.S. PATENT DOCUMENTS

| | | |
|---|---|---|
| 3,887,800 A | 6/1975 | Johnson |
| 4,023,903 A | 5/1977 | Scheib |
| 4,190,321 A | 2/1980 | Dorer et al. |
| 4,885,663 A | 12/1989 | Parker |
| 4,935,079 A | 6/1990 | Nelson-Ashley et al. |
| 4,945,008 A | 7/1990 | Heyes et al. |
| 4,957,820 A | 9/1990 | Heyes et al. |

(Continued)

FOREIGN PATENT DOCUMENTS

| | | |
|---|---|---|
| EP | 1025390 B1 | 10/2002 |
| EP | 1724621 A1 | 11/2006 |

(Continued)

OTHER PUBLICATIONS

PCT/US2010/028067 International Search Report.

(Continued)

*Primary Examiner* — Jennifer A Steele
(74) *Attorney, Agent, or Firm* — Womble Carlyle Sandridge & Rice LLP

(57) ABSTRACT

A diffuse light reflector is disclosed for use in lighting fixtures including luminaires, light boxes, displays, signage, daylighting applications, and the like. The reflector includes a light reflective nonwoven, a polymer layer that enhances reflectivity, and an opaque blackout layer. The reflector can be laminated to coil steel or aluminum and can be formed in metal coil or sheet forming operations. The polymer layer can be easily cleaned of machine oils from the metal forming operations.

15 Claims, 6 Drawing Sheets

(56) References Cited

U.S. PATENT DOCUMENTS

| | | | |
|---|---|---|---|
| 4,975,138 A | 12/1990 | Finlayson | |
| 5,059,460 A | 10/1991 | Heyes et al. | |
| 5,234,516 A | 8/1993 | Okamura et al. | |
| 5,440,197 A | 8/1995 | Gleckman | |
| 5,456,967 A * | 10/1995 | Nezu | 428/141 |
| 5,596,450 A | 1/1997 | Hannon | |
| 5,627,426 A | 5/1997 | Whitman et al. | |
| 5,672,409 A | 9/1997 | Miyakawa et al. | |
| 5,800,909 A | 9/1998 | Nitta et al. | |
| 5,851,936 A | 12/1998 | Marshall | |
| 5,976,686 A | 11/1999 | Kaytor et al. | |
| 6,123,442 A * | 9/2000 | Freier et al. | 362/559 |
| 6,189,934 B1 | 2/2001 | Scruggs | |
| 6,235,105 B1 | 5/2001 | Hubbard et al. | |
| 6,272,265 B1 | 8/2001 | Franklin | |
| 6,282,821 B1 | 9/2001 | Freier et al. | |
| 6,301,770 B1 | 10/2001 | McIlwraith | |
| 6,464,367 B2 | 10/2002 | Ito et al. | |
| 6,497,946 B1 | 12/2002 | Kretman et al. | |
| 6,607,794 B1 | 8/2003 | Wilson et al. | |
| 6,617,019 B2 | 9/2003 | Danner et al. | |
| 6,641,880 B1 | 11/2003 | Deyak et al. | |
| 6,671,452 B2 | 12/2003 | Winston et al. | |
| 6,780,355 B2 | 8/2004 | Kretman et al. | |
| 6,974,498 B2 | 12/2005 | Brown | |
| 7,416,774 B2 | 8/2008 | Ueda et al. | |
| 7,441,916 B2 | 10/2008 | Masuyama et al. | |
| 2001/0010630 A1 | 8/2001 | Umemoto | |
| 2002/0007576 A1 | 1/2002 | Gai | |
| 2003/0067759 A1 | 4/2003 | Blanchard | |
| 2003/0095332 A1 | 5/2003 | Gardner et al. | |
| 2003/0118805 A1 | 6/2003 | Kretman et al. | |
| 2003/0134086 A1 | 7/2003 | Nun et al. | |
| 2004/0004827 A1 | 1/2004 | Guest | |
| 2004/0005451 A1 | 1/2004 | Kretman et al. | |
| 2004/0047162 A1 | 3/2004 | Saccomanno et al. | |
| 2004/0071937 A1 | 4/2004 | Chien et al. | |
| 2004/0080938 A1 | 4/2004 | Holman et al. | |
| 2004/0104663 A1 | 6/2004 | Umeya et al. | |
| 2004/0119400 A1 | 6/2004 | Takahashi et al. | |
| 2005/0106333 A1 | 5/2005 | Lehmann et al. | |
| 2005/0116607 A1 | 6/2005 | Park et al. | |
| 2005/0140258 A1 | 6/2005 | Leu et al. | |
| 2005/0154109 A1 | 7/2005 | Li et al. | |
| 2005/0191464 A1 * | 9/2005 | Takahashi et al. | 428/141 |
| 2005/0221121 A1 | 10/2005 | Ishihara et al. | |
| 2006/0008638 A1 | 1/2006 | Kiehne et al. | |
| 2006/0008641 A1 | 1/2006 | Kiehne et al. | |
| 2006/0067079 A1 | 3/2006 | Noh et al. | |
| 2006/0087863 A1 | 4/2006 | Choi et al. | |
| 2006/0109685 A1 | 5/2006 | Noh et al. | |
| 2006/0216477 A1 | 9/2006 | Peng et al. | |
| 2006/0262310 A1 | 11/2006 | Starry et al. | |
| 2007/0230191 A1 | 10/2007 | Komuro et al. | |
| 2007/0251422 A1 | 11/2007 | Maenaka et al. | |
| 2007/0263411 A1 | 11/2007 | Schellhorn et al. | |
| 2008/0080055 A1 * | 4/2008 | Lightfoot et al. | 359/599 |
| 2008/0113183 A1 | 5/2008 | Kitai et al. | |
| 2008/0206458 A1 | 8/2008 | Watanabe et al. | |
| 2008/0225512 A1 | 9/2008 | Roberts et al. | |
| 2008/0291536 A1 | 11/2008 | Etori | |
| 2008/0291696 A1 | 11/2008 | Kim et al. | |
| 2008/0305365 A1 | 12/2008 | Yamazaki et al. | |

FOREIGN PATENT DOCUMENTS

| | | |
|---|---|---|
| EP | 1767963 | 3/2007 |
| JP | 2003-235353 | 8/2003 |
| JP | 2004-151707 A | 5/2004 |
| JP | 2006-323392 A | 11/2006 |
| WO | WO-99/21913 A1 | 5/1999 |
| WO | WO-01/09227 A1 | 2/2001 |
| WO | WO02/089559 A2 | 11/2002 |
| WO | WO-2004/017700 A1 | 2/2004 |
| WO | WO2008/076410 A1 | 6/2008 |

OTHER PUBLICATIONS

PCT/US2010/028067 Written Opinion.

Gichaba, Justus Ogwoka, "Measurements of TYVEK Reflective Properties for the Pierre Auger Project", Aug. 1998, Unpublished thesis, The University of Mississippi.

Levinson, Ronnen, "Cool Colors for Summer: Characterizing the Radiative Properties of Pigments for Cool Roofs", EETD Noon Seminar (presentation), Apr. 22, 2004.

Arteaga Velázquez, J.C. et al., "Device for diffused reflectivity measurement of samples immersed in water", *Superficies y Vacío*, Dec. 2000, pp. 50-52, vol. 11, Sociedad Mexicana de Ciencia de Superficies y de Vacío.

Supplementary European Search Report from EP 10 75 4216.

* cited by examiner

A                                    B

A B

DIFFUSIVE LIGHT REFLECTORS WITH POLYMERIC COATING AND OPAQUE BLACKOUT LAYER

This application is a Continuation of, and claims benefit to, U.S. application Ser. No. 12/728,164, filed Mar. 19, 2010, which claims benefit to Provisional Application No. 61/210,674 filed Mar. 20, 2009. Both applications are specifically incorporated herein by reference in their entirety.

BACKGROUND OF THE INVENTION

1. Field of the Invention

The invention relates to a polymeric coated diffuse light reflector for use in light reflective articles such as lighting fixtures and the like in which diffuse light reflectance is desired, and specifically to polymeric coated diffuse light reflectors with an opaque blackout layer.

2. Description of Related Art

Reflectors are used in numerous types of lighting fixtures to maximize the usable light, thus increasing the lighting efficiency. Maximization is achieved through a combination of reflecting and redirecting light generated by the lamp in a desired direction, and minimizing the light absorbed by the reflector. This is particularly important when the light fixture design includes a light cavity in which light rays are redirected multiple times within the cavity before exiting the light fixture as usable light. Fixtures that use reflectors include tubular fluorescent lamps and light emitting diodes (LED).

Tubular fluorescent lamps emit light in 360 degrees around the lamp, thus the reflector redirects light from the back of the lighting fixture as usable light. LED light fixtures use a reflector in order to mix, obscure, or diffuse the discrete image(s) of individual LED lamps. This reflector often consists of painted metal or highly polished aluminum. It is desirable to maximize the light reflected by the reflector and minimize the light absorbed by the reflector, as any light absorbed is unusable, thereby decreasing the efficiency of the fixture.

Additionally, reflectors are used in horticulture applications to distribute and maximize light in a grow space environment. Because natural and man-made source of light, such as LED, HID (High Intensity Discharge) and tubular fluorescent lamps are emitting light from relatively fixed position(s), the distribution of light is unevenly dispersed from the canopy down to the stem/trunk of the subject plant. Gardeners employ reflectors in the grow space environment to redirect this light back onto the subject plant. Distributing light on the sides and underneath the foliage of the plant helps the overall stimulation of the subject and encourages healthy foliage/fruit growth. Having light reflected underneath the leaves is also know to discourage molds, fungi, and pests.

Diffuse reflectance occurs when incident light is reflected by a surface such that the reflected light is scattered randomly or in a Lambertian fashion. By contrast, specular reflectance occurs when incident light is reflected at the same angle as the incident angle. Specular reflectors have been used in light fixtures to both direct light out of the fixture in a controlled or focused distribution and increase overall fixture efficiency. Diffuse reflectance is preferred in situations in which low glare is desired and/or in which it is desired to distribute light evenly over as broad an area as possible. White, diffuse reflectors are often used in room and office lighting to reduce specular glare.

The reflector surface includes metal components fabricated from coil steel or aluminum. Coil steel or aluminum is coated in continuous coil equipment with a paint typically containing titanium dioxide light scattering particles, and the coating is subsequently cured. The resulting coil surface has a reflectance of up to about 91% and can be metal-formed into reflectors or light fixture bodies. Alternatively, powder coat paint is applied to light fixtures post metal-forming to provide a surface reflectance of up to 94%.

Plexifilamentary film-fibril sheet material made by flash spinning high density polyethylene sold under the trade name DuPont™ Tyvek® is known for use as a light reflective material. Such sheet material is believed to have a high diffuse reflectance because it is made from continuous fibers having a refractive index of 1.4 and because it contains voids or pores having an average diameter of less than 600 nm. Such sheet material may be preferred over many other known polymer-based sheet materials used in light reflectors because of the relatively high degree of diffuse reflectance and its color stability in the presence of ultraviolet light.

Other known sheet or roll-good plastic based white reflectors include multilayer PET films filled with titanium dioxide ($TiO_2$) or barium sulfate then bi-axially stretched to create microvoids conducive to light reflection, such as Lumirror® film available from Toray Plastics (America), Inc. (North Kingstown, R.I.). Another known reflector material is a reflective microcellular foamed polymer sheet, such as reflective microcellular foamed polyester sheet available as MC-PET from Furukawa Electric Co. Ltd. (Tokyo, Japan). Another known reflector material is a highly reflective film made by expanding polytetrafluoroethylene (ePTFE) to create inter-tangled fibrils with voids that reflect light, such as those available from W. L. Gore & Associates, Inc. (Newark, Del.).

In light fixture fabrication for fluorescent office or general lighting fixtures, coil steel or aluminum is typically used as the fixture housing and possibly also as the reflector placed behind the lamp. The housing and/or reflector metal strips are stamped or roll-formed from a pre-painted metal sheet or coil. Stamping is done with a single or progressive die for more demanding dimensional changes. Other metal forming metal operations may include punching to form wire access holes or knock-outs, bending or computer-controlled cutting. Coil paint formulations are designed to withstand the many possible metal forming operations without cracking, crazing or delaminating.

Housings are used to secure the lamp, ballast connections, and may serve as the reflective surface behind the lamp. In many cases a metal reflector is placed in the housing behind the lamp to improve light output. Anodized specular aluminum reflectors are common for this use along with high reflectance painted white aluminum.

Forming a metal-plexifilamentary film-fibril sheet laminate is limited by the surface properties of the plexifilamentary film-fibril sheet. The porous nature of the sheet makes it susceptible to contamination from machine oil present in the forming process. The fibrous nature of the material presents an aesthetically different surface than paint and also can lead to fraying on punched or cut edges.

SUMMARY OF THE INVENTION

It would be desirable to provide a diffuse light reflector for use in lighting fixtures formed from coil steel or aluminum which would take advantage of the high diffuse light reflectance of plexifilamentary film-fibril sheet while avoiding the limitations of the sheet in this application. It would also be desirable to have the high diffuse reflectance at a total reflectance that is higher than what is possible with commercially available plexifilamentary film-fibril sheet material. Further, in a horticulture application, it would be desirable to have a diffuse reflective surface to improve light distribution to a subject plant and have the reflective surface be opaque to prevent light escape from the growroom.

In one aspect, a diffuse light reflector is disclosed, which comprises a plexifilamentary film-fibril sheet substrate having a first side and a second side, wherein the first side is adapted to be adjacent to a light source, and a polymer layer on said first side of said film-fibril sheet, and an opaque blackout layer on said second side of said film-fibril sheet, wherein the polymer layer is a polyolefin, polyester, polyacrylate or blends thereof.

In a further aspect, a method of providing diffuse light to plants is disclosed, which comprises: (a) providing a plexifilamentary film-fibril sheet substrate having a first side and a second side, wherein the first side is adapted to be adjacent to a light source, and a polymer layer on said first side of said film-fibril sheet, and an opaque blackout layer on said second side of said film-fibril sheet, wherein the polymer layer is a polyolefin, polyester, polyacrylate or blends thereof; and (b) directing diffuse light from said plexifilmentary film-fibril sheet onto said plants.

DETAILED DESCRIPTION OF THE INVENTION

Figure 1:
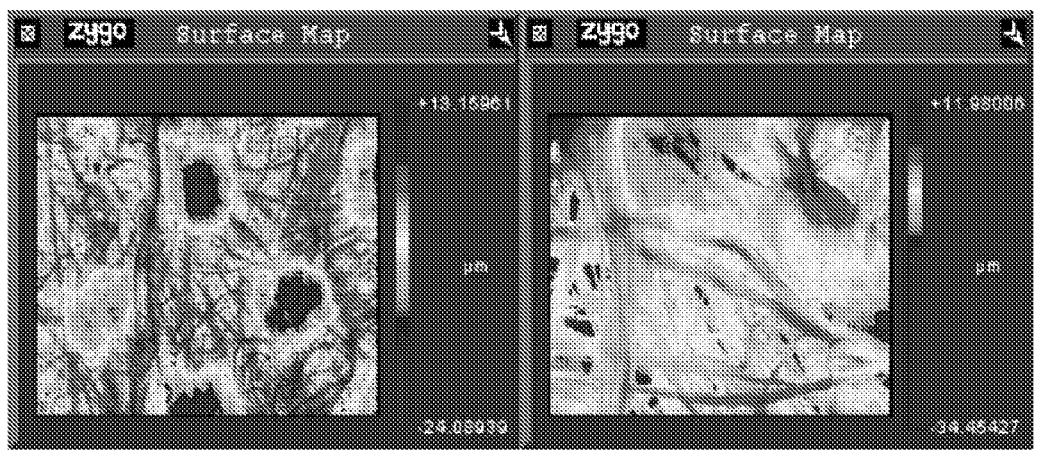
FIGS. 1a and 1b show the surface roughness of Tyvek 1070D at approximately 10% gloss at 5× and 20× magnification, respectively.

A diffuse light reflector is disclosed, which comprises a plexifilamentary film-fibril sheet substrate having a first side and a second side, wherein the first side is designated to be adjacent to a light source, and a polymer layer on said first side of said film-fibril sheet, wherein the polymer layer is a polyolefin, polyester, polyacrylate, or blends thereof.

The substrate is a plexifilamentary film-fibril sheet made from flash spun polymer. One such sheet is formed from high-density polyethylene and is available as DuPont™ Tyvek® from E.I. du Pont de Nemours & Co. (Wilmington, Del.). The starting material for the sheet is a lightly consolidated flash-spun polyethylene plexifilamentary film-fibril sheet produced by the general procedure of Steuber, U.S. Pat. No. 3,169,899. A high-density polyethylene is flash spun from a solution of the polyethylene in a solvent. The solution is continuously pumped to spinneret assemblies. The solution is passed in each spinneret assembly through a first orifice to a pressure let-down zone and then through a second orifice into the surrounding atmosphere. The resulting film-fibril strand is spread and oscillated by means of a shaped rotating baffle, is electrostatically charged and then is deposited on a moving belt. The spinnerets are spaced to provide overlapping, intersecting deposits on the belt to form a wide batt which is then lightly consolidated. The term "plexifilamentary" as used herein, refers to a strand which is characterized as a three-dimensional integral network of a multitude of thin, ribbon-like, film-fibril elements of random length and of less than about 4 microns average thickness, generally coextensively aligned with the longitudinal axis of the strand. The film-fibril elements intermittently unite and separate at irregular intervals in various places throughout the length, width and thickness of the strand to form the three-dimensional network. Such strands are described in further detail by Blades and White, U.S. Pat. No. 3,081,519 and by Anderson and Romano, U.S. Pat. No. 3,227,794.

The film-fibril sheet has two sides, where one side is adapted to be adjacent to a light source. That is, the film-fibril sheet is designed to be installed into a lighting fixture where one side or face will be facing the light source and will incorporate the polymer layer. Light emitted from the light source is reflected from this face to be directed out of the light fixture to improve fixture brightness and light distribution.

Multiple film-fibril sheet substrate layers may be included in the reflector of the invention, which may increase reflectance. Sheets can be bonded together using adhesive lamination either through liquid adhesive coating and lamination or melt-polymer lamination using known adhesives, including polyethylene/ethylene methacrylic acid (EMA) blended resin extruded between the layers. In a two layer film-fibril sheet configuration, the adhesive can be applied to the side of the fibril sheet that is opposite the side adapted to be adjacent to a light source, wherein said polymer layer is located on said additional polymer layer.

The polymer layer acts as a protecting coating, and can be applied to the substrate using known techniques, including extrusion, spraying, imbibing, dipping, and rolling. The polymer layer is applied on the side of the film-fibril sheet that is adapted to be adjacent to a light source. Suitable polymers for use in the polymer layer include polyolefins including low density polyethylene (LDPE) and high-density polyethylene (HDPE), polyacrylates, including polyethylene/methacrylate copolymers, polyesters, including polyethylene terephthalate (PET), and blends thereof. The polymers can be virgin, recycled, or blends thereof. The polymer layer also provides resistance to oils and grease. Alternatively, an ethylene methyl acrylate (EMA) or other suitable lower melt temperature polymer can be applied as a bond layer to the plexifilamentary film-fibril sheet with the polymer layer subsequently applied on top of the EMA layer. For example, the EMA bond layer can be extruded onto the substrate with the polymer layer either co-extruded simultaneously on top or subsequently extruded in a multi-pass coating process. Suitable ethylene methyl acrylate copolymers include Optema® TC120 by ExxonMobil Chemical Company (Houston, Tex.), Nucrel® 1214 by E.I. du Pont de Nemours & Co. (Wilmington, Del.), and Lotryl® 18MA by Arkema Inc. (Philadelphia, Pa.).

The polymer can optionally include known polymer additives such as pigments, dyes, UV stabilizers, optical brighteners, antioxidants, flame retardant agents, and anti-microbial agents, and mixtures thereof.

The polymer layer can also include titanium dioxide or barium sulfate. The concentration of titanium dioxide or barium sulfate is at a weight percentage that provides good dispersion within the polymer and extrusion of the polymer in a melt extrusion screw and die, including up to about 20% by weight of the polymer layer, from about 3% to about 20%, from about 5% to about 20%, from about 5% to about 15%, and from about 10% to about 20% by weight of the polymer layer.

Multiple layers of polymer can be used to both increase opacity and reflectance. Multiple thin layer coatings have less thermal impact on the reflective substrate than one thick layer coating. The additional polymer layer can be applied to the film-fibril sheet on the side adapted to be adjacent to a light source, or on the polymer layer.

The polymer layer imparts a matte-finish topography to the substrate, which causes the gloss level to be lower and the reflector more diffuse than substrates without the polymer layer. Gloss levels can be less than 10%, including less than 9%, 8%, 7%, 6%, and 5%. Further, the polymer layer increases the reflectance of the substrate from less than about 93% to greater than about 94%, including about 95%, 96%, and 97% measured at 550 nm. One way to impart a matte-finish is to use a matte chill roller on the polymer layer immediately after application. For example, a matte chill roller with an average roughness value of 122.5 measured according to ASME Surface Roughness Metric JIS B 0601 can be used immediately after the polymer layer is extruded on the film fibril sheet.

The disclosed diffuse light reflectors can have an average (mean) roughness (Ra) from about 6.4 microns to about 2.8 microns, including from about 6.0 microns to about 3.0 microns, from about 5.5 microns to about 3.0 microns, from about 4.5 microns to about 3.0 microns, and about 3.5 microns measured at 5× magnification. Further, the range in average surface roughness (i.e. roughness uniformity) of the diffuse light reflectors is less than about 1 micron, including less than about 0.8 microns, less than about 0.6 microns, and about 0.4 microns. The low average surface roughness values coupled with the low roughness uniformity values contribute to the high reflectance values and low gloss values. The roughness values are taken from the first side with the polymer layer.

The diffuse light reflector can also have an opaque blackout layer on the side of the film-fibril sheet that is opposite the side containing the polymer layer (i.e. on the backside of the film-fibril sheet). The opaque blackout layer can contain a pigment, including carbon black. In a horticulture application, the blackout layer lowers the escape of light out of the grow room environment to other adjacent rooms or spacing, causing unwanted growth or neighbor annoyance. Further, the diffuse light from the reflector is directed onto the plants, thereby enhancing growth.

The reflector can be made to be fully melt recyclable as it may be comprised of thermopolymers and additives known to be conducive to melt-recycling. Further, coloring agents can be added to the polymer to impart a nonwhite color or hue to the substrate.

The reflector can be affixed to steel, including coil steel, aluminum, or other flexible articles to create a formable reflective surface. The reflector can be affixed to coil steel or aluminum using any known means, such as bonding with a hot melt adhesive, lamination, or autoclaving. Suitable adhesives include polyethylene, such as low density polyethylene, ethylene methyl acrylate copolymer (EMA) based hot melt adhesives, or an epoxy adhesive containing acrylic polymer, such as methacrylate. The laminate of the reflector and the coil steel or aluminum sheet can then be formed according to known processing to form the laminate to the desired shape. The reflector-metal laminate can be handled in metal forming operations such as stamping, rolling and punching without oil soaking into the pores of the plexifilamentary film-fibril sheet, thus eliminating the need for a removable protective film cover during manufacture of lighting fixtures.

The lighting fixture is formed by applying the reflector-metal laminate to any surface for use in lighting fixtures such as luminaires, signage, daylighting applications, etc. Suitable surfaces include but are not limited to flexible planar substrates, rigid substrates such as lighting fixture housings, coil steel or aluminum sheet, low-cost semi-flexible polyester sheet and the like.

It will be readily apparent to one of ordinary skill in the relevant arts that other suitable modifications and adaptations to the methods and applications described herein are obvious and may be made without departing from the scope of the invention or any embodiment thereof. Having now described the present invention in detail, the same will be more clearly understood by reference to the following examples, which are included herewith for purposes of illustration only and are not intended to be limiting of the invention.

EXAMPLES

Examples 1-5 measure the reflectance of several aspects of the disclosed diffuse light reflector and several film fibril sheets without a polymer coating. Reflectance measurements were obtained using an Avantes Spectrocam spectrophotometer (available from Avantes Inc., Broomfield, Colo.) with 0°/45° measuring geometry per ANSI/ISO 5.4 and 1.5×2 mm diameter measuring aperture calibrated to a factory-matched white standard. The output is percent reflectance at each wavelength and the spectral range measured is 380 nm to 750 nm in 5 nm intervals. For each sample, 10 readings were taken randomly across a 10 cm area and averaged to account for variation in the coating. Reflectance at 550 nm was used for comparison between samples.

Example 1

Low density polyethylene combined with 14% $TiO_2$ pigment by weight was extruded onto Tyvek® 1070D plexifilamentary film-fibril sheet to achieve a coating weight of 22 grams per square meter. The extruded layer was passed over a matte-finish chilled roll imparting a random micro-finish topography. The total thickness of the coated sheet was measured at 215 microns. As a result of coating, the reflectance of the sheet increased from 93.5% (uncoated sheet) to 96% (coated sheet). The coating partially obscured the fiber pattern of the sheet resulting in a more uniform appearance. Machine oils put onto the surface were easily cleaned off without a visible stain. A sample of the coated sheet was exposed to 110° C. in a convection oven for 12 hours and suffered a 2% loss in reflectance. An additional sample was exposed to 80° C. in a convection oven for 12 hours without reflectance loss.

Example 2

55% low density polyethylene, 33% high density polyethylene and 12% $TiO_2$ pigment by weight were combined and extruded onto Tyvek® 1070D plexifilamentary film-fibril sheet to achieve a coating weight of 35 grams per square meter. The extruded layer was passed over a matte-finish chilled roll imparting a random micro-finish topography. The total thickness of the coated sheet was measured at 228 microns. The reflectance increased as a result of coating from 93.5% to 96.5%. As in Example 1, the coating partially obscured the fiber pattern for a more uniform appearance, and oils on the surface were easily cleaned off without a visible stain. The coated sheet was exposed to 110° C. in an oven for 12 hours without reduction in reflectance.

Example 3

EMA resin (Lotryl® 20MA08) combined with 7% $TiO_2$ was extruded onto the reverse (previously uncoated) side of the material from Example 1 to achieve a coating weight of 22 grams per square meter and passed over a matte-finish chilled roll for a matte finish. The total sheet thickness was measured at 218 microns. The reflectance of the EMA-coated side was measured as 94%. The EMA-coated side was then applied to 0.026" (0.66 mm) thick unpainted cold rolled steel preheated to 80° C. The reflectance of the laminate face (side not bonded to metal) was measured at 95.7%

Example 4

The coated sheet from Example 3 was laminated to steel by applying the LDPE coated side to 0.026" (0.66 mm) thick painted cold rolled steel preheated to 120° C., passed through a laminating nip roll and chilled using room temperature water. The coated sheet was thoroughly bonded to the metal as only intra-sheet delamination was observed when attempting to peel the sheet from the metal. The laminate was able to withstand a O-T bend and ball-punch test without delaminating from metal. The reflectance of the laminate face (side not bonded to metal) was measured at 94.0%.

Example 5

Two layers of Tyvek® 1070D plexifilamentary film-fibril sheet were laminated to each other by extruding 22 grams per square meter of LDPE onto the first layer then combining the second layer prior to a chilled nip roll. The 2-layer laminate was then overcoated on both sides by extruding a mix of 55% LDPE, 33% HDPE and 12% $TiO_2$ pigment by weight to achieve a coating weight of 35 grams per square meter on each side. The extruded layers were passed over a matte-finish chilled roll immediately after extrusion to impart a matte finish. The total thickness was measured at 483 microns. The reflectance of the sheet increased from 93.5% of the uncoated single layer to 97.0%.

Example 6

94% LDPE by weight combined with 6% carbon black by weight was extruded onto the backside of the sheet from Example 3 to form a sheet with one side white and one side black. The white side was measured at 95.5% reflectance. The sheet was found to be completely light blocking or opaque as measured by placing the white side completely over a 216 watt T5 fluorescent light fixture and measuring less than 1 candela from the black side.

Figure 2:
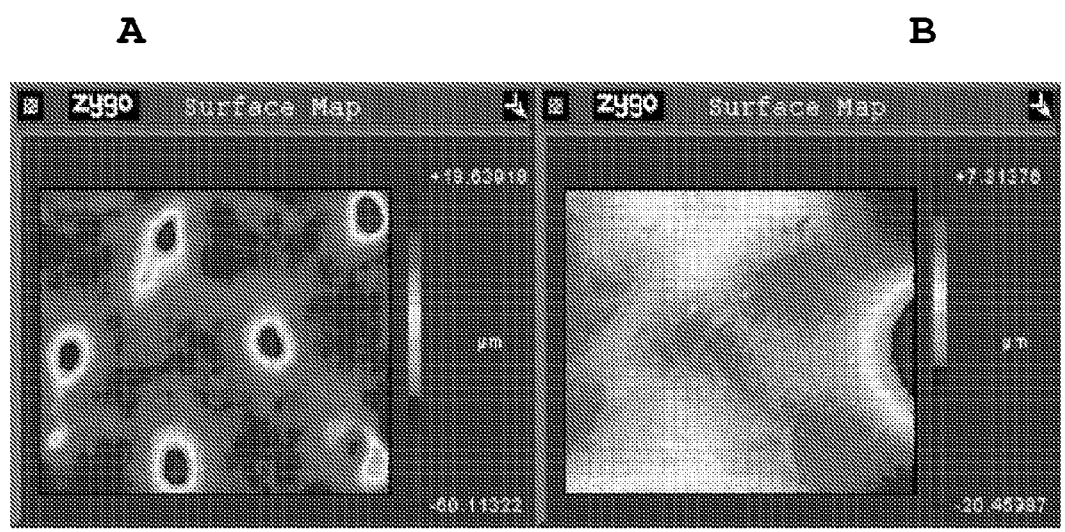
FIGS. 2a and 2b show the surface roughness of Tyvek 1070D coated with Behr paint at 5× and 20× magnification, respectively.
Figure 3:
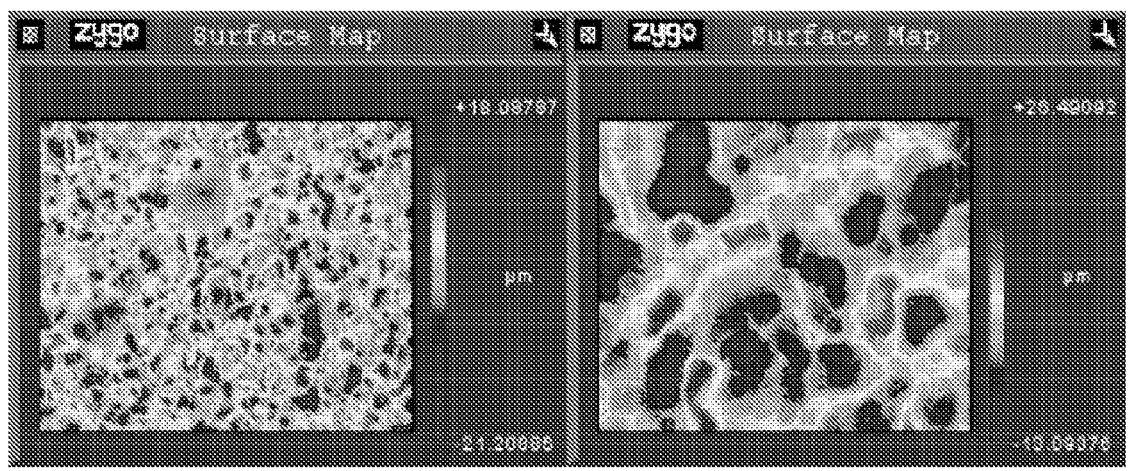
FIGS. 3a and 3b show the surface roughness of one aspect of disclosed diffuse light reflector at 5× and 20× magnification, respectively.
Figure 4:
FIGS. 4a and 4b show the surface roughness of Tyvek 1070D saturated with acrylic binder at 5× and 20× magnification, respectively.
Figure 5:
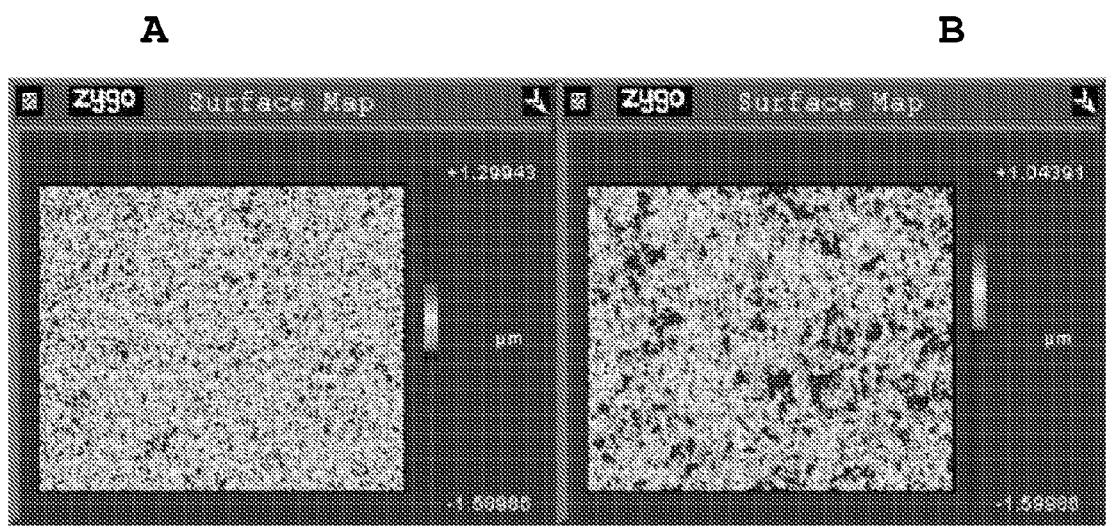
FIGS. 5a and 5b show the surface roughness of Toray E60L biaxially stretched PET at 5× and 20× magnification, respectively.
Figure 6:
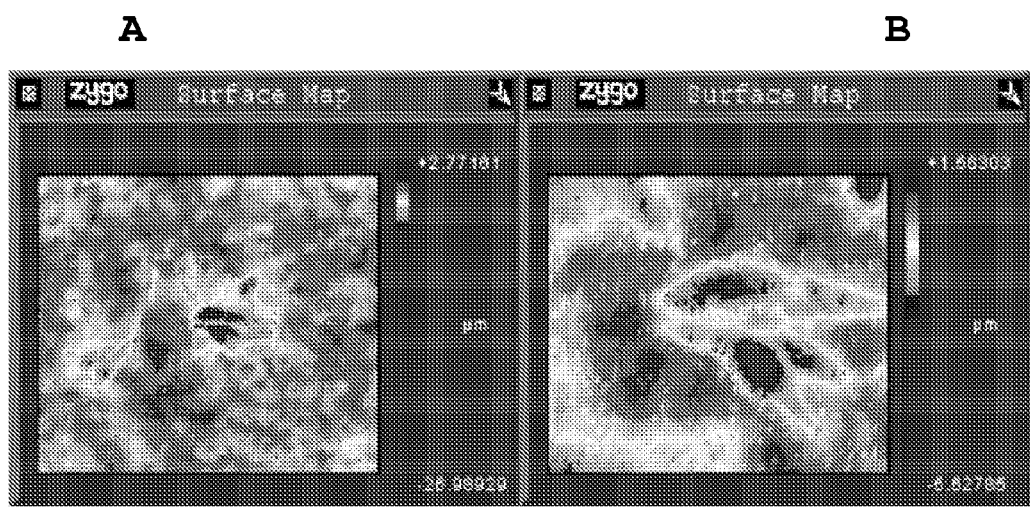
FIGS. 6a and 6b show the surface roughness of Furukawa Microcellular PET (MCPET) at 5× and 20× magnification, respectively.

Examples 7-12 measure the gloss percent, average peak surface roughness, root-mean square roughness, and average surface roughness of five known diffuse light reflectors and one aspect of the disclosed diffuse light reflector. The gloss measurements were taken using a NGL60, Novo Gloss Lite 60°, by Rhopoint Instruments, with a 60°-8×15 mm ellipse aperture per ASTM D2457. The roughness values are the average (mean) of 10 measurements at 5× magnification. The surface roughness measurements were taken using a Zygo NewView 7300. The NewView 7300 uses non-contact scanning white light and optical phase shifting interferometry for highly precise, three dimensional surface height measurements up to 20 mm, with height resolution of $\geq 0.1$ nm. FIGS. 1-6 show the surface roughness of Examples 7-12, respectively, using the Zygo NewView 7300. Table 1 below shows the gloss percent, PV, rms, Ra, and Uniformity values at 5× magnification.

TABLE 1

| Example | Material | Gloss (Percent) | PV (microns) | rms (microns) | Ra (microns) | Ra range (microns) i.e. Roughness Uniformity |
|---|---|---|---|---|---|---|
| 7 | Tyvek 1070D | 11 | 44.801 | 4.989 | 3.929 | 1.556 |
| 8 | Tyvek coated with Behr paint | 18 | 82.107 | 11.144 | 6.611 | 4.22 |
| 9 | Diffusive Reflector from Example 2 above | 5 | 41.086 | 4.491 | 3.512 | 0.401 |
| 10 | Tyvek saturated with acrylic binder | 15 | 38.458 | 3.704 | 2.835 | 1.126 |
| 11 | Toray E60L biaxially stretched PET | 26 | 2.631 | 0.147 | 0.115 | 0.007 |
| 12 | Furukawa Microcellular PET (MCPET) | 54 | 20.14 | 0.743 | 0.5 | 0.471 |

PV (Peak-to-Valley) is the difference between the highest and lowest points within the sample. PV is also known as Rt. When used to quantify roughness, PV is the maximum roughness height. PV is the worst case point-to-point error in the date set. PV compares the two most extreme points on the surface; thus, it is possible for two very different surfaces to have the same PV value.

rms (Rq) is the root-mean-square roughness deviation from the center line. This is a method of calculating an average roughness by squaring each value and then taking the square root of the mean. The rsm result is calculated as the standard deviation of the height (or depth) of the test surface relative to the reference at all data points in the data set.

Ra is an average (mean) roughness value and is the arithmetic average roughness deviation from the center line.

Uniformity is the range of Ra from high to low. The lower the Uniformity number, the more uniform the surface roughness.

As shown in Table 1, Example 9, which represents one aspect of the disclosed diffuse light reflector, has a much more uniform surface roughness than the coated Tyvek (Example 8) and the acrylic saturated Tyvek (Example 10). Specifically, the roughness uniformity is less than 1 micron, which contributes to the about 94% or greater reflectance values at 550 nm and gloss levels less than 10%.

The invention has been described above with reference to the various aspects of the disclosed diffuse light reflectors, laminates, and lighting fixtures. Obvious modifications and alterations will occur to others upon reading and understanding the proceeding detailed description. It is intended that the invention be construed as including all such modifications and alterations insofar as they come within the scope of the claims. All patents and publications cited herein are entirely incorporated herein by reference.

What is claimed is:

1. A diffusive light reflector comprising:
a plexifilamentary film-fibril sheet substrate having a first side facing a light source and a second side, and
a polymer layer on the first side of the film-fibril sheet, said polymer layer comprising high density polyethylene, low density polyethylene, and titanium dioxide.

2. The diffusive light reflector of claim 1, further comprising an opaque blackout layer on the second side of the film-fibril sheet.

3. The diffusive light reflector of claim 1 having a gloss of less than 10%.

4. The diffusive light reflector of claim 3 having a gloss of about 5%.

5. The diffusive light reflector of claim 1 having a reflectance from about 94% to about 97% measured at 550 nm.

6. The diffusive light reflector of claim 1 having an average surface roughness on said first side from about 6.4 microns to about 2.8 microns, measured at 5× magnification.

7. The diffusive light reflector of claim 6, wherein the average surface roughness is about 3.5 microns, measured at 5× magnification.

8. The diffusive light reflector of claim 1, having a roughness uniformity on said first side of less than about 1.0 microns, measured at 5× magnification.

9. The diffusive light reflector of claim 8, wherein the roughness uniformity is about 0.4 microns, measured at 5× magnification.

10. The reflector of claim 1 having a thickness between about 150 microns and about 1000 microns.

11. The reflector claim 1, wherein said polymer layer is extruded on said first side of said film fibril sheet.

12. The reflector of claim 1, wherein the titanium dioxide is greater than about 3 to about 20 weight percent of said polymer layer.

13. A laminate comprising the reflector of claim 1 affixed to a steel or aluminum sheet.

14. A lighting fixture comprising the laminate of claim 13, wherein said lighting fixture is selected from the group consisting of luminaries, lighted signs, and daylighting reflectors.

15. The reflector of claim 2, wherein said opaque blackout layer comprises carbon black.

* * * * *